United States Patent [19]
Giddey et al.

[11] Patent Number: 5,126,160
[45] Date of Patent: Jun. 30, 1992

[54] AQUEOUS FOAMING COMPOSTION AND METHOD FOR HOMOGENIZINGLY INCORPORATING WATER INTO LIPOPHILIC MATERIALS

[75] Inventors: Claude Giddey, Geneva; Georges Dove, Carouge/GE, both of Switzerland

[73] Assignee: Battelle Memorial Institute, Carouge, Switzerland

[21] Appl. No.: 642,287

[22] Filed: Jan. 17, 1991

Related U.S. Application Data

[60] Division of Ser. No. 416,300, Oct. 3, 1989, Pat. No. 5,004,623, which is a continuation-in-part of Ser. No. 208,478, Jun. 20, 1988, abandoned.

[30] Foreign Application Priority Data

Jun. 26, 1987 [CH] Switzerland .................. 2409/87

[51] Int. Cl.$^5$ ............................................. A23G 1/00
[52] U.S. Cl. .................................. 426/564; 426/601; 426/660
[58] Field of Search ................... 426/564, 660, 601

[56] References Cited

U.S. PATENT DOCUMENTS

| | | | |
|---|---|---|---|
| 2,586,615 | 2/1952 | Cross | 426/660 |
| 2,626,216 | 1/1953 | Cross | 426/660 |
| 3,232,765 | 2/1966 | Rosenthal et al. | 426/660 |
| 3,491,677 | 1/1970 | Bracco | 426/268 |
| 3,701,669 | 10/1972 | Van Den Hoven | 426/564 |
| 4,045,583 | 8/1977 | Jeffery et al. | 426/660 |
| 4,081,559 | 3/1978 | Jeffery et al. | 426/572 |
| 4,418,089 | 11/1983 | Bouette | 426/564 |
| 4,446,166 | 5/1984 | Giddey et al. | 426/660 |

*Primary Examiner*—R. B. Penland
*Attorney, Agent, or Firm*—Cushman, Darby and Cushman

[57] ABSTRACT

A lipophilic mass is liquefied or ground to a powder and there is incorporated therein by blending a foam of fine air or gas bubbles in water, then it is allowed to cool and degas. The foam is stabilized by the addition of a foamer, for instance an amphipatic surfactant, and may contain viscosity enhancers and thickeners. The method is applied to the hydration of chocolate in order to improve its storage stability and heat resistance; the foamer can be a whipped solution of egg-white or of esters of fatty acids with polyols.

18 Claims, No Drawings

AQUEOUS FOAMING COMPOSTION AND METHOD FOR HOMOGENIZINGLY INCORPORATING WATER INTO LIPOPHILIC MATERIALS

This is a division of application Ser. No. 07/416,300, filed Oct. 3, 1989, U.S. Pat. No. 5,004,623, which is a continuation in part of Ser. No. 07/208,478, filed Jun. 20, 1988, now abandoned.

The present invention relates to an aqueous foam forming composition and to a method using the foamed composition for intimately and uniformly incorporating water into a solid hydrophobic and lipophilic phase for instance fat containing cosmetics and food products, namely fat ingredients for cosmetic creams, bakery, pastry and confectionery fillers, icing, topping and alike products. An example of a material with such properties is a fatty material containing hydratable sugars and other hydrophilic components, e.g. chocolate, either for chocolate bars or for other confectionery applications. Incorporating water into chocolate can modify some of its physical properties, e.g. its behavior under hot conditions. Hence the invention will be exemplified here with reference to chocolate although it should in no way be limited thereto.

It is well known that when a small quantity of water is uniformly incorporated to chocolate, the resistance of the latter to heat improves and the chocolate has less tendency to soften and become tacky when the temperature exceeds 25°-30° C. Chocolate is usually composed of fats (cocoa butter) containing, dispersed therein, non-fat substances such as cocoa solids (cellulose fibers, flavors, theobromine, etc.), sugars, proteins (e.g. milk proteins). In addition, other ingredients may also be present in chocolate, e.g. fruits, almonds, nuts, special flavors, liquors etc.). The main chocolate phase (a continuous lipophilic phase) therefore comprises fats and its melting temperature is generally rather low. Thus when this phase which consists generally of cocoa butter (a mixture of stearyl, oleyl and palmityl tri-glycerides) is exposed to heat, it starts softening at already 28° C. and the chocolate looses its strength and body. The mass does no longer "break" cleanly, it collapses and unpleasantly sticks to the wrapper. Furthermore, cocoa butter blooming may eventually appear on the surface of the chocolate upon cooling, such "blooms" unpleasantly looking like molds.

It has been sought to remedy these drawbacks in many fashions, for instance by selecting higher melting fats or, better, by attempting to locally disrupt the continuous fat phase in the chocolate so as to minimize the effects of fat melting on the overall strength loss of the chocolate mass. Such disruption can be obtained by increasing the proportion in the mass of the high melting hydrophilic components, i.e. either by fully embedding the fat within the hydrophilic components, i.e. fully embedding the fat particles in the high melting or infusible components by phase inversion (which means that the fat phase becomes then entirely discontinuous), or by building inside the mass a high melting network structure which traps the fat therein, i.e. like when a soaked sponge retains a liquid in its pores.

A network of this kind can result from the presence in the chocolate of some added water intimately dispersed therein.

For instance, patent CH-A-410.607 (MARS) discloses a chocolate composition containing hydrophilic substances like dextrose, maltose, invert sugar, fructose, xylose, mannitol, sorbitol, etc. The chocolate articles cast with this composition are subjected to a moist atmosphere whereby they absorb an amount of water. This water absorption increases the volume of the hydrophilic components relative to that of the fat components and improves the heat resistance of the chocolate.

In patents CH-A-399.891 and 489.211 there is disclosed a method of incorporating amorphous sugars to a chocolate composition. These sugars participate to the construction, with water absorption, of a cross-linked structure which prevents the mass from collapsing when the temperature exceeds the melting temperature of the fats used in the chocolate.

Moreover, in patent CH-A-409.603 there is described the direct incorporation of water into chocolate at the manufacturing stage. The amount of water is about 5% by weight of the composition and its addition leads to a rapid thickening of the molten mass (around 30° C.), whereby it can no longer be directly cast in the form of chocolate articles by pouring into moulds. The hydrated composition must therefore be ground to a powder and the powder is sintered to forms under pressure. The compositions according to this method are typical inverted phase structures, i.e. structures in which the chocolate fat is substantially totally embedded in a matrix of high melting or non-fusible hydrophilic material. Similar methods are disclosed in CH-A-405.908 and DRP 389 117. In U.S. Pat. No. 2,760,867 water is incorporated into chocolate during manufacture by using, in addition, a known emulsifier, e.g. lecithin. According to U.S. Pat. No. 4,081,559 a quantity of sugar is added to chocolate such that, when water is ultimately added for providing a heat-resistant chocolate, an aqueous solution of sugar is produced which contains edible fats in emulsion form.

According to another method disclosed in CH-A-519.858, the fats are incorporated in encapsulated form into the chocolate composition, this encapsulation being by means of microcapsules or vesicles of less than 2 mm formed of an edible non-liposoluble membrane; the resulting composition is a heat resistant chocolate.

Document FR-A.2.318.589 describes a technique for intimately incorporating water to the fat phase of a food composition, for example a chocolate composition in which the following operations are performed: in a composition containing 15-35% of an edible fat and at least 40% of sugar by weight, there is emulsified a quantity of water sufficient to make 100%. Then the water is evaporated until separation of the fatty and aqueous phases occurs, so as to achieve an edible composition whose moisture content does not exceed 5% by weight, and in which each individual fat globule is embedded in amorphous sugar (sugar glass). A composition of this kind resists temperatures up to 65° C.

Japanese document J-60-027.339 discloses the preparation of a chocolate with a high water content; this is achieved by adding the water to the chocolate maintained at a temperature below 60° C.

According to Japanese document J-59-156.246, a chocolate containing a small quantity of water which is added to improve its structure is made by incorporating thereto hydrated ingredients such as glucose syrup, sucrose, invert sugar, starch, honey, sorbitol, etc. This technique allows incorporating from about 1.5 to 5% of water to the chocolate with no need to make an emulsion.

From the foregoing descriptions of the prior art, it is obvious that many techniques have already been proposed to incorporate water into lipophilic edible products, e.g. chocolate, for the purpose of modifying or improving the physical and physiological properties thereof. However, generally the addition of water by conventional means leads to an extremely rapid thickening of the lipophilic mass and it is practically impossible to very finely and homogeneously distribute this water within the lipophilic mass. This is the reason why conventionally hydrated chocolate had, until now, a rather grainy texture which was considered commercially unattractive. The present inventor has already proposed to cure the difficulty (see U.S. Pat. No. 4,446,166) by first emulsifying the water in a solid fatty phase, then grinding this emulsion into a powder of very fine particles and finally dispersing these particles in a mass of molten chocolate. Since the solid fat phase embedding the water has significant thermal inertness, this technique makes it possible to homogeneously distribute the fat-encapsulated water into the liquid chocolate mass before the encapsulating fat melts and the trapped water is released from the particles.

Although this method is very efficient, it has the drawback that the chocolate mass to be treated must be first prepared with less fat than usual since the remaining amount of fat is brought later as a pulverized solid water emulsion; hence this change caused undesirable preliminary manufacturing problems (new formulae, changes of viscosity of the conged chocolate, etc.). Therefore the present inventor searched new means providing even better performance and making it possible to avoid a late addition of fat as in the aforementioned technique. The present inventor reasoned on the principle that in order to homogeneously introduce a small or very small concentration of water in a phase not compatible with water, i.e. a bulk or mass of lipophilic material, one must first "dilute" this water in a relatively large volume of a medium which is compatible with this lipophilic phase (i.e. for instance the solid fat used in the technique of U.S. Pat. No. 4,446,166); however, first this medium should not be a fat (for the reasons explained before), and second, the addition of foreign material should be minimized as much as possible for not altering the product final formulation. It was therefore tempting to use a gas as the "diluting medium". Indeed, when a lipophilic phase is intimately mixed with a gas loaded with water, the gas can thereafter be eliminated easily (for instance by degassing) and only the water remains distributed in said lipophilic phase.

A "dilution" of water in a gas can be achieved by means of a foam which may result, for instance, from the whipping of an aqueous solution of a foaming agent in the presence of air or a gas. According to a variant, the gas can be dissolved in the solution under pressure and, upon releasing suddenly the pressure, a foam of the gas in the solution is produced. On the other hand, the film of solution which constitutes the walls of the foam bubbles should preferably be compatible with the material of the lipophilic phase to be hydrated homogeneously; therefore, the foaming agent should preferably have, in addition to the normal hydrophilic groups which work to diminish the surface tension of the water, functions which can dissolve in the lipophilic phase or which, at the least, have definite compatibility with said lipophilic phase. A foaming agent of this kind having simultaneously hydrophilic and lipophilic functional groups is sometimes called an amphipatic compound or surfactant.

The method of the invention, which derives from the above reasoning, and the aqueous foamer composition with which it can be carried out, are summarized in the Claims. It is possible that the efficiency of the present method and the consequent high degree of homogenization of the water in the lipophilic phase are related to the properties of the foaming agent, preferably amphipatic, dissolved in the film of solution which forms the walls of the foam bubbles. Although the exact abetting mechanism here has not been discovered, it is probable that most of the molecules of the foaming agent are arranged in a direction perpendicular to the film making the bubble walls, the hydrophilic functions being dissolved therein and the lipophilic groups pointing away from the film toward the center of the bubbles. When the foam is mixed with the lipophilic mass, the lipophilic functional groups of the foamer dissolve in the lipophilic phase and, as the bubbles collapse during degassing, the water of the film remains intimately dispersed therein because of the presence of said lipocompatible functional groups of the foamer which stay dissolved in the lipophilic phase. When the lipophilic phase material is normally solid at ambient temperature, it is first melted by heating; then the foam is incorporated therein and the blend is allowed to degas and to cool, whereby it solidifies and the gas escapes.

The amphipatic foamers which are convenient in this method include all physiologically acceptable foaming surfactants having, on one hand a hydrophilic functional end (cationic, anionic, or non-ionic) and, on the other hand, a hydrophobic and lipophilic group. These compounds, of which there exists many examples in the prior art on detergents, surfactants and liposomes, include fatty acids derivatives, sulfonates, phosphonates, quaternary ammonium compounds, lipids, sterols, esterified carbohydrates, polypeptides, vegetal and animal proteins with foaming properties, saponins, soaps, etc.

When the phase to be thickened is the fatty phase of chocolate, there are used, naturally, edible surfactants such as soy protein foamers and derivatives, partly hydrolyzed casein, partly hydrolyzed gluten, lecithin, albumin, milk proteins, stearyl tartrate, carbohydrate (e.g. sucrose, lactose, glucose, fructose) esters, monoglycerides, di- and triglycerides, and others. The requirements for such a surfactant and the aqueous foamer composition containing it are that they should provide a homogeneous foam of density 0.2 or lower, preferably 0.05 to 0.2, comprising bubbles of a size from about 0.1 to 100 μm diameter from a water solution having a concentration of surfactant of about 0.1 to 30% by weight. Hence, when using from 0.01 to 1 or 2 part by volume of foam by part of lipophilic mass, the quantity of water incorporated therein can be in the range of up to 20% by weight or more. Preferred proportions are about 0.1 to 5% by weight of water in the lipophilic phase. The bubbles should be durable enough to withstand the effort of blending the foam and the liphophilic material before the gas is released.

For embodying the method of invention, the foam is admixed with the lipophilic material and thoroughly blended therewith. The lipophilic material can either be in solid fluidized powder form or it can be heated and brought to a fluid (liquid) state by melting. Blending can be performed by conventional means (kneader, blender, agitated vessel) provided the blending motion is smooth enough not to destroy the foam bubbles before the foam is intimately dispersed in the lipophilic phase. A typical case is that of hydrating chocolate, the detailed steps of which are disclosed now.

A composition with lipophilic character, for instance a mass of chocolate, is first prepared and brought to the liquid state by usual means and using usual ingredients. The mass can optionally be tempered, but this is not a must. Tempering means that cocoa butter crystallization "germs" (crystallites) are generated within the liquid chocolate mass containing molten cocoa butter. This is accomplished by temporarily cooling the molten mass, while subjecting it to a kneading effect, from about 35° C. where it is liquid to 25°-27° C.; then it is brought back to 29°-31° C. In an embodiment of the invention, the mass is tempered and, once again at 29°-31° C., there is added thereto 0.2 to 1 part by volume of the foregoing aqueous solution foam; the mixture is stirred and kneaded for a few minutes to ensure homogeneous dispersion whereby it remains perfectly fluid for some time, then it is further processed while it is still fluid, for instance it is cast into moulds. The amount of foam to be added is calculated to correspond, depending on its concentration, to the incorporation of about 0.5 to 2% by weight of water to the chocolate. Generally, the gas or the air of the foam readily escapes afterwards from the liquid lipophilic mass. However, the trapped air or gas can be eliminated more quickly from the cast mixture by subjecting it to reduced pressure or by pressing it mechanically to produce a squeezing effect. Preferably, this degassing operation is carried out when the mass is still liquid or fluid so as to speed up the gas evolution. Then the mass is usually allowed to cool, for instance between 10° or 20° C., whereby it sets and solidifies. However, in an embodiment the mass can be cooled to a highly viscous or thermal plastic state before degassing and then subjected to sudden reduced pressure which leads to expansion. This expanded structure is preserved after complete solidification and the presence of residual air or gas therein does not impede the homogeneous distribution of the water into the mass and the providing thereto of unusual heat resistance properties. The degree of homogeneous distribution of the water in the chocolate can still be further improved by storing it for several hours, after solidification by cooling, e.g. 12-48 hrs, at 27° C.

In addition to the heat resistance given to the chocolate, the method of the invention also markedly reduces the tendency to "fat blooming" after heat exposure during storage followed by cooling. Usually, this phenomenon appears as unpleasant whitish rash on the surface of the chocolate due to the exudation of cocoa butter and eventual recrystallization.

The foam to be used in the present invention can be of any kind within the foregoing property limits. It is prepared by usual means, for instance with an industrial high speed mixer or by whipping with a whip or in an industrial whipping apparatus.

Other ingredients than the required foaming agent can be incorporated to the solution used to make the foam. Among useful additional ingredients (to be used dissolved or as suspensions), the following can be recited: gums and carbohydrates which can retard (because of their hydrophilic character) the diffusion of the water of the foam into the lipophilic mass; sweetening agents, flavors, hydrophilic compounds (glycerol, propylene glycol, sorbitol, etc.), gluconic acid, liquors, etc.

The amount of foaming agent (or agents) in the foamer composition should be about 0.05 to 30% by weight. It should however be noted that a relation exists between this concentration and the nature of the amphipatic agent. For instance with animal and vegetal proteins, the concentration should be relatively high, i.e., on the high side of the range, say from about 5 to 30% by weight. With other edible amphipatic surfactants, for instance non-ionic surface active compounds, the concentration of foaming agent can be much lower, say from about 0.1 to 5% or even 0.05 to 2% by weight. This is an advantage when it is desired that amount of surfactant in the final product be minimized as much as possible, for instance because of requirements issued by the Food & Drug Administration. However, the foams obtained with low or very low concentrations of non-ionic foamers are not very durable and may collapse before mixing with the lipophilic phase is complete. Hence for reinforcing the stability and durability of such foams, water soluble viscosity enhancers and thickeners are added.

Viscosity enhancers, the quantity by weight of which in the foamer composition is preferably about 5-30%, include, for example, at least an edible diol or polyol having 2 to 25 hydroxy groups. Viscosity enhancers include glycols, glycerol and other monomeric and oligomeric polyols such as the sugars and corresponding alcohols (i.e. compounds in which the sugar carbonyl is no longer present). All these compounds are physiologically acceptable and of foodstuff quality, namely glucose, fructose, lactose, maltose, sucrose, galactose, sorbitol, maltitol, mannitol and the like. Of course, crude preparations of the foregoing like fruit juices or syrups (corn syrup, glucose syrup) or molasses are also possible. Other viscosity enhancers are the oligomeric polyglycols (polyoxyalkylene glycols) and polyglycerol with from about 2 to 6 monomeric units. Generally the amount of viscosity enhancer is selected (in combination with the other ingredients of the foamer composition) for having viscosities in the range of 5 to 100 cP, preferably 5 to 30 cP, before whipping. However this is not really critical and viscosities below and above the given range are possible in special cases.

As thickeners which are preferably added at a concentration of 0.1 to 2% by weight, one may cite the water soluble edible cross-linked polypeptides and carbohydrates, e.g. pectin, gum guar, xanthan, tragacanth, arabic, dextrin, amylopectin, carrageenan, alginates and the like. Agar is also possible but less preferred because of limited solubility.

When the foregoing viscosity enhancers and thickeners are used, the concentration of the amphipatic foamer can be kept low or very low provided its amphipatic nature is well equilibrated, i.e. its hydrophilic-lipophilic balance (HLB) should preferably be in the range of 15-30. The amphipatic surfactants which fall in this class are preferably the esters of fatty acids (preferably saturated) having more than about 12 carbon atoms, e.g. palmitic, stearic and arachidic acids, with glycols and polyols, for instance erythritol, sorbitol, inositol, glycerol (mono-, di-, tri- or polyfunctional esters), polyglycerol and polyoxyalkylene glycols like polyethylene glycol or polypropylene glycol. The esters including 2 to 12 units of glycol or glycerol are advantageous to achieve a HLB in the desired range. In this connection, it is reminded that the higher the HLB, the stronger the hydrophilic nature of the amphipatic compound. Among the commercial amphipatic surfactants which are convenient in this embodiment of the invention are the edible products defined as "Tween" ® (ATLAS, Chem. Ind., Great-Britain), some of which provide foams with the required properties.

The gase to be used for preparing the present foam can be any non-toxic and physiologically acceptable gases including air, nitrogen, carbon dioxide, $N_2O$, rare gases and the like. Vapors of volatile compounds including innocuous hydrocarbons and halocarbons can also be used provided they have no odor or after taste (or at least leaving no odor in the product after degassing).

The foamer composition can also comprise further ingredients (dissolved or dispersed therein), for instance hygroscopic carbohydrates which can retard the diffusion of water in the lipophilic material, sweeteners, flavors, acidifiers like gluconic, citric or malic acid, spirits, seasoners, spices, dyestuffs, vitamins, stabilizers, antioxidants and the like. The use of the foamer composition according to the invention is therefore particularly useful since many additives are ill-compatible with fats and can be incorporated very homogenously in the lipophilic products when in the form of a foam. In addition to chocolate, this particularly applies to a full range of other lipophilic materials including cosmetics (lanolin creams and ointments) and food products to which hydrophilic additives are incorporated in the form of aqueous solutions.

Additives include biocompatible and edible dyes (cochenilla carmin, vegetable dyes, elder-berry blue, etc.), vitamin C, $B_1$, panthotenic acid, benzoate stabilizers and the like. The lipophilic products in which it may be desirable to incorporate the foregoing additives include edible vegetal and animal fats, lard, peanut butter, tallow and pastry or confectionery formulations such as fillers or icing and topping mixtures.

Hence, according to the method of the invention, one can incorporate into fats hydrosoluble substances which are normally not compatible with said fats. For doing this, the hydrophilic substances are dissolved in the solution to be foamed, then the solution is beaten to a foam and the latter is intimately incorporated to the fat (in the liquid state), as indicated before in the case of chocolate. Then, after cooling, the lipophilic phase (the fat for instance) sets to a solid.

The following examples illustrate the invention in more detail.

EXAMPLE 1

An egg-albumin foam was prepared by whipping in air at room temperature a 20% by weight aqueous egg-white solution. The egg-white used was dried pulverized egg-white. Using 18 g of such a solution provided 400 ml of foam, density=0.05; 3.5% (v/v) of water.

In another container provided with a stirrer-kneader was placed 1 kg of ordinary commercial milk-chocolate, in liquid form as taken from a conche apparatus. In the present example, the milk-chocolate essentially included the following ingredients by weight: fats 32% (cocoa butter 26%, milk-fats 6%); non-fatty milk solids 11%; non-fat solids and other components of cocoa 29%; sugars 27%; residual moisture 0.4–0.6%. The chocolate is conched at a temperature of 55° C. and is free flowing at this temperature. The one kilogram sample of chocolate was first tempered, i.e. it was temporarily cooled to 26° C. which induced the formation of cocoa butter crystallites, then it was reheated to 29.5° C. Under these conditions, the mass is still free flowing and, under agitation, the aforementioned albumin foam was added thereto in a matter of 15–30 sec, after which stirring was continued for a few minutes, e.g. 5–10 min.

Then, without waiting longer, the mass was cast into moulds and the moulds were allowed to cool slowly according to usual technique. After complete solidification, the chocolate was removed from the moulds; its aspect was undistinguishable from control chocolate prepared from the same batch but without the foregoing water addition treatment.

The hydrated test chocolate and the control chocolate were submitted to a group of experienced tasters who were unable to discover substantial organoleptic differences between the two kinds of chocolate.

Several samples of the test chocolate prepared and cast as described above, and controls having the same composition but for the water of hydration, were heated for 2 hrs at 37° C. in a heated enclosure. Then the samples and controls were subjected to a hardness "penetration" test. In this test a device with a vertically sliding needle is placed on the chocolate surface and the force necessary to drive the needle into the chocolate to a given depth (namely 3 mm in the test) is measured. For the control samples the force was 6 g whereas in the test sample the force was 58 g (average).

In another test samples of test chocolate and controls were held at 50° C. overnight in a heated enclosure. The test samples were not altered by the treatment, for instance under stress the bars broke cleanly as if the temperature was not over 20°–25° C., and the broken surface was neat and dry. In contrast, the controls had become viscous and collapsed completely.

EXAMPLE 2

An aqueous foamer composition was prepared by dissolving the following ingredients in water between 30° and 60° C.:

| Ingredients | % by weight |
| --- | --- |
| Water | 78 |
| Sucrose (crystals) | 20.4 |
| Pectin (from apples) | 0.8 |
| Tween-65 ® (a polyoxy-ethylene-sorbitan tristearate) | 0.8 |

The above composition (viscosity 15 cP at 20°–22°, Brookfield) was whipped under air just before use to provide a foam of density 0.05–0.1; 3.5% (v/v) of water.

In a container provided with a slow-working stirrer were introduced 1 kg of commercial milk-chocolate brought directly from conche in the liquid state. The chocolate comprised the following components:

| Components | % by weight |
| --- | --- |
| Cocoa butter | 26 |
| Milk fats | 6 |
| Non-fat milk solids | 11 |
| Non-fat cocoa solids + other substances | 29 |
| Carbohydrates (sugars) | 27 |
| Moisture | 0.4–0.6 |

The chocolate is liquid at 55° C. and it was tempered under agitation; for this it was allowed to come to 26° C. at which temperature cocoa butter started to crystallize; then it was heated to 29.5° C. At this temperature, the achocolate has excellent fluidity and under agitation there was admixed, in the course of 15-30 sec, 0.5-0.6 liter of the foregoing foam, then agitation was continued for a few minutes.

The liquid mixture was cast into moulds and allowed to cool as usual for slow solidification. After one night rest, the chocolate was removed from the moulds. No visual difference with control chocolate (identically conched but not hydrated chocolate) was observed.

Both test and control chocolates were tasted by a group of experienced tasters; no significant organoleptic differences were noted except for a kind of cooler feeling with the test chocolate.

Several samples of moulded chocolate prepared as disclosed above, followed by maturation at 27° C. for 48 hours, and controls having the same composition but not having been hydrated were stored for 2 hours in a hot cabinet at 40° C. Then they were subjected to the penetration test described in example 1. The results were like that in example 1.

The results after one night storage at 50° C. were similar to those observed in the same test reported in example 1.

EXAMPLE 3

A series of foamer compositions were prepared from various ingredients summarized in Table 1 hereafter. The preparation technique was the same as that in the foregoing example. The several compositions (1c to 5b) were foamed in air as described previously. Parameters pertaining to compositions and foams (viscosity, pH, densities) are also recorded in Table 1 in which the following designations are used:

| | |
|---|---|
| Tween ®-65 foamer = | polyoxyethylene-sorbitan tristearate |
| Tween ®-60 foamer = | polyoxyethylene-sorbitan monostearate |
| Dimodan ®-PMF-foamer = | fatty acid monoglyceride (Grindsted, Denmark) |
| Pectin R thickener = | fast pectin |
| Pectin L thickener = | slow pectin |
| Satialgil ® 14-CET = | alginate (SATIA, France) |
| Lygomme ®-J = | carrageenan (SATIA) |

The quantities of the ingredients listed in Table 1 are in % by weight (water contitutes the remainder to make 100%); composition viscosities are in cP and foam density in g/cm$^3$.

TABLE 1

| Ingredients | Experiment No | | | | | | | |
|---|---|---|---|---|---|---|---|---|
| | 1c | 1d | 1e | 2a | 2b | 2c | 2d | 2e |
| Tween-65 | 0.7 | 0.7 | 0.7 | 0.7 | 0.7 | 0.7 | 0.7 | 0.7 |
| Sucrose (cryst) | — | 11 | 20 | — | — | 20 | 20 | — |
| Pectinated sugar | 20 | 9 | — | — | — | — | — | — |
| Glucose | — | — | — | 20 | — | — | — | — |
| Invert sugar | — | — | — | — | 28.6 | — | — | — |
| Cane sugar | — | — | — | — | — | — | — | 20 |
| Pectin R | 0.7 | 0.7 | 0.35 | 0.7 | 0.7 | 0.7 | — | 0.7 |
| Pectin L | — | — | — | — | — | — | 0.7 | — |
| Density | 0.13 | 0.2 | 0.14 | 0.14 | 0.16 | 0.13 | 0.15 | 0.12 |
| Viscosity | 12 | 10 | 17 | — | 22 | 15 | — | 13 |
| pH | 4.6 | — | — | — | — | — | — | — |

| Ingredients | Experiment No | | | | | | | | | |
|---|---|---|---|---|---|---|---|---|---|---|
| | 3a | 3b | 3c | 3d | 3e | 4a | 4b | 4f | 5a | 5b |
| Tween-65 | — | — | 0.7 | 0.7 | 0.7 | 0.7 | 0.7 | 0.7 | 0.7 | 0.7 |
| Tween-60 | 0.7 | — | — | — | — | — | — | — | — | — |
| Dimodan-PMF | — | 0.7 | — | — | — | — | — | — | — | — |
| Maltodextrin MD-65 | — | — | 20 | — | — | — | — | — | — | — |
| Sucrose | 20 | 20 | — | — | 15 | 20 | 20 | 20 | 20 | 20 |
| Xylitol | — | — | — | 20 | — | — | — | — | — | — |
| Glycerol | — | — | — | — | 5 | — | — | — | — | — |
| Pectin R | 0.7 | 0.7 | 0.7 | 0.7 | 0.7 | — | — | — | 0.7 | 1.2 |
| Satialgil 14-CET | — | — | — | — | — | 0.7 | 0.3 | — | — | — |
| Lygomme-J | — | — | — | — | — | — | — | 0.25 | — | — |
| Density | 0.15 | 0.2 | 0.2 | 0.12 | 0.13 | 0.16 | 0.19 | 0.2 | 0.16 | 0.2 |
| Viscosity | — | — | — | 15 | 14 | — | — | 5 | — | — |
| pH | 4.6 | — | — | — | — | 7 | 6.9 | — | — | — |

A quantity of 680 g of milk-chocolate (provided by a renown U.S. manufacturer) was put into a stirred vessel like disclosed in example 1 in admixture with 0.3% by weight of lecithin and brought to the molten state by raising the temperature to 50° C. The texture of the chocolate was rather grainy (milling grade>50 μm). The molten mass was tempered as described before (35°-25.2°-31.5° C.), then there was added and thoroughly mixed 13.2 g of the foam under 2e in Table 1; blending time was about 4-6 min. The viscosity of the melt increased very slightly after addition of the foam, hence casting into moulds was performed under optimal conditions.

After cooling and removing from the moulds, the chocolate bars and blocks were stored for 40 hours at 27° C. to effect maturation, after which they were subjected to the test of resistance to heat as described in previous examples. Very significant results were noted although less marked than in example 2; this difference probably results from a smaller proportion of hydrophilic particles within the fat phase due to less complete milling of the chocolate.

EXAMPLE 4

680 g of grade-4 milk chocolate were used; this chocolate comprises the following ingredients in % by weight;

| | |
|---|---|
| Cocoa butter | 8% |
| Other fats compatible with cocoa butter | 8.5% |
| Cocoa liquor | 18% |
| Sugar (crytallized) | 35% |
| Lactose | 8% |
| Dried milk powder | 22% |
| Lecithin | 0.4% |

This chocolate which has a very finely milled texture (<12 μm) was brought to the molten state at 50° C. and tempered (temperatures 50°-30°-25.5°-31.5° C.), then 13.2 g of foam 2e (Table 1) were added and blended thoroughly.

Further operations were then exactly as in the previous examples, i.e. moulding, solidifying, maturing and testing. In this case, the effects of hydration on the resistance to temperature elevation were excellent; the improvements expressed in terms of penetration decrease of the needle test are about 10 fold relative to controls (same chocolate not hydrated).

Thereafter, a series of experiments using the same chocolate grade were performed using the same quantity of added water (1.5% by weight) and the various foams listed in Table 1. All experiments were positive, the best results (in terms of heat resistance) being observed when using the foams indexed under Nos 1c, 2c, 3a, 3d, 3e, and 5a.

EXAMPLE 5

Hydration of a lipophilic filler for pies and tarts.

In this case the problem is to finely and homogeneously distribute hydrophilic lipophobic constituents in aqueous solution into a lipophilic material.

A lipophilic product to be used as filler for cakes and pies was prepared by blending at 35°-40° C. (this temperature is slightly above the melting of the fats) in a mixer-kneader 320 g of "Biscuitine" (a vegetal shortening), 220 g of powdered dried milk solids and 460 g of sucrose (from sugar beets). The mass was thoroughly kneaded for 10-15 min until it was fully homogeneous.

An aqueous composition was prepared containing 32 g of water, 6 g of sucrose, 0.4 g of pectin, 40 mg of ascorbic acid, 60 mg of Betanine (a natural elder-berry dye) and 0.3 g of Tween ® −65. The composition had a viscosity about 18 cP. This composition was beaten under air to give a foam of density about 0.1.

The foam was slowly incorporated to the kneaded lipophilic mass (35°-40° C.) while avoiding to break the foam under blending until a well homogeneous mixture was achieved (slow blending for 4-5 min). Then the blend was allowed to cool under rest while degassing and solidification occurred. A colored filler mass was therefore obtained with very fine grained texture in which the hydrophilic additives are intimately distributed although they are naturally not compatible with the fats of the lipophilic phase.

This product was successfully used for making pastry and confectionery articles.

If in the foregoing example sucrose is replaced in the foamer composition by other carohydrates, namely glucose or lactose or by sweetening polyalcohols (e.g. sorbitol), similar results are experienced.

If in the foregoing example air for beating is replaced by other innocuous gases, e.g. $N_2O$, $CO_2$, $N_2$ or noble gases, similar results are experienced.

EXAMPLE 6

Reagglomeration of praline dust.

Praline is normally manufactured by baking a mixture of sweet almonds and sugar; then the product is crushed in a mill to provide a coarse powder which is sieved to retain the particles of 1-2 mm. This powder is much appreciated in bakery and confectionery for enrobing, icing, topping and the like.

Unfortunately a lot of praline dust is formed in milling and sieving which cannot be readily used because it is too fine. Hence usually praline dust is lost unless it can be reagglomerated with water.

The problem here is to rehydrate homogeneously a lipophilic material consisting of praline dust. If praline dust can be reagglomerated to larger particles, it can be reused in confectionery like normal praline powder. But homogeneously adding water to praline dust is extremely difficult as it repells water vigorously because of its lipophilic properties. Consequently, one cannot homogeneously incorporate water to praline dust by usual means. The present invention solves elegantly this problem.

To 500 g of praline dust (approximate composition 20% fats, 15% of proteins, 50% of sugars, the remainder being minerals and fibers) was added by blending a foam prepared as follows: a solution was made by dissolving 4.5 g of cane sugar, 0.2 g of Tween ® −65 and 0.2 g of pectin (from apples) in 22 g of water. This solution was foamed by whipping in air.

After a few minutes of blending, the foam collapsed and disappeared but the dust was converted to a slightly moist free-flowing coarse powder of reagglomerated praline dust.

The powder was further granulated in a granulator-calibrator apparatus (grains of 1-2 mm) and it was heated for a few seconds in an air stream at 150° C. (fluidized bed) in order to effect full drying. The powder was thereafter successfully used for making pastry and confectionery products exactly as with original praline powder.

In a control experiment, praline dust was moistened by spraying with a fine water mist; the rehydration attempt was unsuccessful as a tacky, pasty mass resulted which could not be worked further.

EXAMPLE 7

Heat conditioning a fat composition for pastry and confectionery.

A lipophilic mass was prepared by blending at 45°-50° C. the following ingredients (% by weight):

| | |
|---|---|
| Whole milk powder | 18 |
| Skim milk powder | 7 |
| Sucrose (finely milled) | 37.5 |
| Lactose | 8 |
| Compound fat (SAIS-555)* | 29.5 |

*From the SAIS Company, Switzerland

A foam was prepared by beating in air a solution of water (80 g), Fructose (18 g), pectin (1.1 g) and Tween ®−65 (0.9 g) until a foam density of about 0.05-0.06 was attained.

Then to 1 kg of the foregoing lipophilic mass at 50° C. and under slow stirring were added 50 g of the foam. The mass was allowed to degas after which it was used as cake-icing or filling, and for coating biscuits. Controls were prepared using the same lipophilic composition but not treated with the foam. After hardening and standing for a few hours at room temperature, the product was found to resist melting under overheated storage conditions much better than the controls.

We claim:

1. Chocolate and cocoa based products comprising an aqueous foamer composition consisting essentially of
   at least one physiologically acceptable amphipatic foaming agent having at least a hydrophilic group and a hydrophobic lipophilic group, wherein said foaming agent is selected from the group consisting of non-toxic and bioacceptable lipids, sterols, polypeptide foamers, animal and vegetal protein foamers, saponins, esterified sugars and carbohydrates, glyceride esters, milk proteins, edible cationic, anionic and non-ionic surfactants, polyoxyalkylene sulfates, sulfonates and phosphonates, and quaternary ammonium compounds,
   said aqueous foamer composition being capable of forming upon beating or whipping in the presence of a gas or air, a foam of density 0.2 g/cm$^3$ or less consisting of fine air or gas bubbles sufficiently stable not to break when blending the foam with a molten lipophilic material selected from the group consisting of chocolate, peanut butter, confectionery fillings, confectionery topping, cake icing and praline so that the water in said aqueous foam becomes intimately and homogeneously distributed in said lipophilic material in an amount of 0.05-5% by weight, before degassing.

2. The chocolate and cocoa based products of claim 1 wherein the foaming agent is a non-ionic foaming agent present in an amount of about 0.5-5% by weight in the aqueous foamer composition.

3. The chocolate and cocoa based products of claim 1, wherein the foaming agent is selected from the group consisting of fatty acid esters and saturated fatty acid esters of glycols and polyols.

4. The chocolate and cocoa based products of claim 3, in which the fatty acid moiety of the esters with glycols and polyols has 12 or more carbon atoms and the glycols and polyols are selected from the group consisting of erythritol, inositol, glycerol, oligomeric polyglycerol with up to 12 glycerol units, sorbitol, polyalkylene glycols, polyethylene glycol, polypropylene glycol and mixtures thereof.

5. The chocolate and cocoa based products of claim 3, in which a hydrophilic-lipophobic balance of the aqueous foamer composition is about 15 to 30.

6. The chocolate and cocoa based products of claim 3, in which the viscosity enhancing agent is selected from the group consisting of glycols, polyglycols, glycerol, polyglycerol, mono-and oligo-saccharides, polyalcohols and polyols resulting from reduction of mono- and oligosaccharides.

7. The chocolate and cocoa based products of claim 6, in which the oligosaccharides and polyols are selected from the group consisting of glucose, fructose, lactose, maltose, sucrose, invert sugar, cane sugar, galactose, sorbitol, maltitol, mannitol, inositol, pentaerythritol, corn syrup and molasses.

8. The chocolate and cocoa based products of claim 3, comprising by weight about 5-30% of viscosity enhancer and about 0.1 to 2% of protein or carbohydrate thickener in the aqueous foamer composition.

9. The chocolate and cocoa based products of claim 8, in which the carbohydrate or protein food thickener is selected from the group consisting of pectin, amylopectin, gum guar, tragacanth, dextrin, gelatin, arabic and carrageenan.

10. The chocolate and cocoa based products of claim 1 wherein the foaming agent is an animal or vegetable protein foaming agent present in an amount of about 5-30% by weight in the aqueous foamer composition.

11. The chocolate and cocoa based products of claim 10 wherein said foaming agent is selected from the group consisting of albumin, hydrolyzed soy proteins, hydrolyzed casein, hydrolyzed gluten and soy derivatives.

12. The chocolate and cocoa based products of claim 10, in which a hydrophilic-lipophobic balance of the aqueous foamer composition is about 15 to 30.

13. The chocolate and cocoa based products of claim 10, in which the viscosity enhancing agent is selected from the group consisting of glycols, polyglycols, glycerol, polyglycerol, mono-and oligo-saccharides, polyalcohols and polyols resulting from reduction of mono- and oligosaccharides.

14. The chocolate and cocoa based products of claim 13, in which the oligosaccharides and polyols are selected from the group consisting of glucose, fructose, lactose, maltose, sucrose, invert sugar, cane sugar, galactose, sorbitol, maltitol, mannitol, inositol, pentaerythritol, corn syrup and molasses.

15. The chocolate and cocoa based products of claim 10, comprising by weight about 5-30% of viscosity enhancer and about 0.1 to 2% of protein or carbohydrate thickener in the aqueous foamer composition.

16. The chocolate and cocoa based products of claim 15, in which the carbohydrate or protein food thickener is selected from the group consisting of pectin, amylopectin, gum guar, tragacanth, dextrin, gelatin, arabic and carrageenan.

17. The chocolate and cocoa based products of claim 1, wherein the foaming agent further includes a water-soluble viscosity enhancing agent consisting of at least an edible diol or polyol having 2 to 25 hydroxy groups and a cross-linked protein or carbohydrate food thickener.

18. The chocolate and cocoa based products of claim 1, wherein said foamer composition has a viscosity of not less than 5 cP.

* * * * *